US008954213B2

(12) United States Patent
O'Donnell et al.

(10) Patent No.: US 8,954,213 B2
(45) Date of Patent: Feb. 10, 2015

(54) ENGINE STARTING STRATEGY TO AVOID RESONANT FREQUENCY

(75) Inventors: Timothy M. O'Donnell, Germantown Hills, IL (US); Evan E. Jacobson, Edwards, IL (US); Brian D. Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 13/545,556

(22) Filed: Jul. 10, 2012

(65) Prior Publication Data

US 2014/0018982 A1 Jan. 16, 2014

(51) Int. Cl.
*B60L 9/00* (2006.01)

(52) U.S. Cl.
USPC .......... 701/22

(58) Field of Classification Search
USPC .......... 701/22
See application file for complete search history.

(56) References Cited

U.S. PATENT DOCUMENTS 5,448,976 A * 9/1995 Treinies et al. .......... 123/406.23
5,537,967 A * 7/1996 Tashiro et al. .......... 123/192.1
6,997,156 B2 2/2006 Tanei et al.
8,015,960 B2 * 9/2011 Watanabe .......... 123/192.1
8,116,957 B2 2/2012 Oh et al.
2004/0233507 A1 * 11/2004 Chu et al. .......... 359/291
2005/0255968 A1 * 11/2005 Sah et al. .......... 477/200
2008/0251303 A1 10/2008 Rouaud et al.
2008/0296819 A1 * 12/2008 Fursdon .......... 267/140.15
2009/0045560 A1 * 2/2009 Fueki et al. .......... 267/140.15
2009/0118914 A1 * 5/2009 Schwenke et al. .......... 701/51
2009/0233766 A1 9/2009 Kadota
2010/0087996 A1 * 4/2010 Haggerty et al. .......... 701/58
2010/0204881 A1 * 8/2010 Muragishi et al. .......... 701/36
2010/0305837 A1 * 12/2010 Gagliano .......... 701/111
2011/0118078 A1 5/2011 Kraska et al.
2013/0296116 A1 * 11/2013 Dai et al. .......... 477/5

OTHER PUBLICATIONS

Eugene Vogel, "Understanding of resonance essential for solving vibration problems", www.plantengineering.com website, all pages, Sep. 17, 2013, retrieved from http://www.plantengineering.com/single-article/understanding-of-resonance-essential-for-solving-vibration-problems/ff141e2eabacb111a88a491024f3ca9f.html.*
"Resonance vibration", www.answers.com website, date unknown, retrieved from http://www.answers.com/topic/resonance-vibration.*

* cited by examiner

*Primary Examiner* — Calvin Cheung
(74) *Attorney, Agent, or Firm* — Leydig, Voit & Mayer, Ltd

(57) ABSTRACT

A machine comprising powertrain components, an engine that applies power to powertrain components, and a hybrid motor that applies power to powertrain components. The machine includes an electronic control module that controls the hybrid motor to apply power to powertrain components. The machine includes an engine parameter sensor. The engine parameter sensor senses engine performance parameters and sends engine performance parameter signals to the electronic control module. The electronic control module monitors engine performance parameters and control the hybrid motor to apply power to the powertrain components to provide hybrid performance parameters to counteract the engine performance parameters.

18 Claims, 2 Drawing Sheets

ENGINE STARTING STRATEGY TO AVOID RESONANT FREQUENCY

TECHNICAL FIELD

This patent disclosure relates generally to engines and, more particularly, to starting engines.

BACKGROUND

Engine driven machines can experience resonance when the vibration frequency of the driving part, such as a motor or engine, matches the mechanical resonant frequencies of the components of the machine. Many large machines experience resonant frequencies within the powertrains as a result of vibration caused by the speed output of an engine as the cylinders of the engine go through the combustion cycle. At certain engine speeds that correspond to resonant frequencies, the amplitude of the torque applied to the component parts increases dramatically, which can damage mechanical components of a machine. Engineers have learned to design power systems so that the resonant frequencies in the powertrain occur at engine speeds outside the normal operating range of a particular machine to avoid damage.

Though not seen in the normal operating range of the machine, resonant frequencies can still occur during lower start-up engine speeds as the engine attempts to overcome the large inertial forces required to rotate large machine components and parasitic load caused by pump drag, engine friction, and other non-inertial loads. Achieving an engine speed above which machine components experience resonance is particularly difficult in cold weather, when an engine can fail to speed up successfully through the resonant frequency engine speeds.

SUMMARY

The disclosure describes, in one aspect, a machine comprising at least one powertrain component, an engine adapted to apply power to the at least one powertrain component, and a hybrid motor adapted to apply power to the at least one powertrain component. The machine also includes an electronic control module configured to control the hybrid motor to apply power to the at least one powertrain component. The machine includes an engine parameter sensor operatively associated with the electronic control module. The engine parameter sensor is adapted to sense engine performance parameters and send signals indicative of the engine performance parameters to the electronic control module. The electronic control module is configured to monitor the engine performance parameters and control the hybrid motor to apply power to the at least one powertrain component to provide hybrid performance parameters to counteract the engine performance parameters.

In another aspect, the disclosure describes a method of starting a machine. The method comprises providing at least one powertrain component and operatively connecting an engine and a hybrid motor to the at least one powertrain component. The engine is adapted to apply power to the at least one powertrain component and to produce various engine performance parameters. The hybrid motor is adapted to apply power to the at least one powertrain component and to produce various hybrid performance parameters. The method also includes monitoring the engine performance parameters and applying power to the at least one powertrain component with the hybrid motor to provide hybrid performance parameters to counteract the engine performance parameters.

In yet another aspect, the disclosure describes a method of starting a machine. The method comprises providing at least one powertrain component and operatively connecting an engine and a hybrid motor to the at least one powertrain component. The engine is adapted to apply power to the at least one powertrain component and to produce various engine torque levels. The hybrid motor is adapted to apply power to the at least one powertrain component and to produce various hybrid torque levels. The method includes determining the engine torque levels and determining the hybrid torque levels. The method includes operatively associating an electronic control module with the engine and the hybrid motor, and monitoring the engine torque levels and the hybrid torque levels with the electronic control module. The engine also includes applying power to the at least one powertrain component with the hybrid motor to provide hybrid torque levels to counteract the engine torque levels.

DETAILED DESCRIPTION

Figure 1:
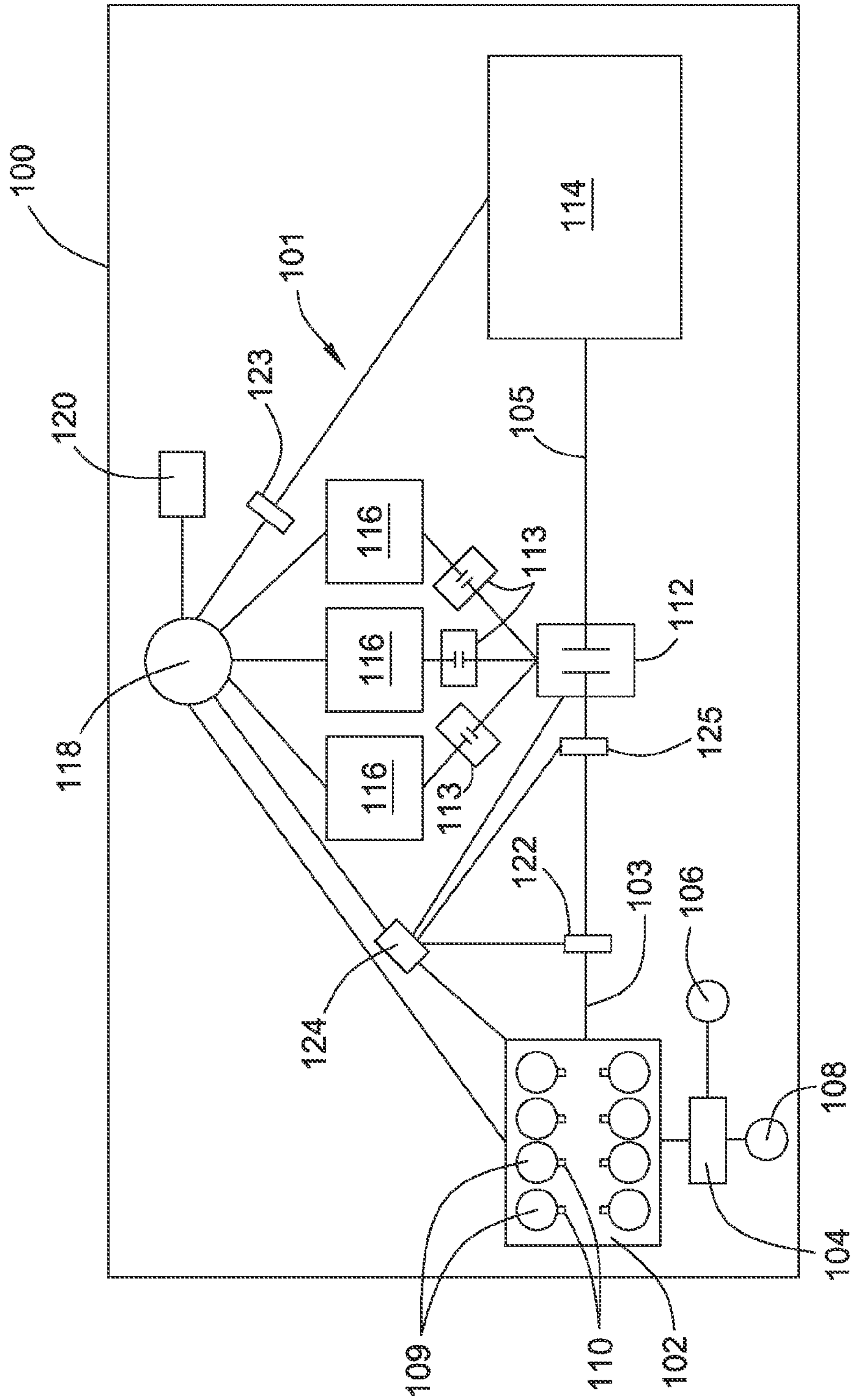
FIG. 1 is a schematic illustration of a machine in accordance with the disclosure.

This disclosure relates to methods of implementing an engine starting strategy for a machine 100 that avoids subjecting the machine and its components to the damaging effects of resonant frequencies occurring in the machine's powertrain. As illustrated schematically in FIG. 1, the machine 100 has a powertrain 101 that includes components such as an engine 102, a crankshaft 103, a clutch 112, a clutch shaft 105, auxiliary mechanisms 116, and a transmission 114. The powertrain 101 can also include other components not illustrated herein. In the illustrated embodiment, an engine starter 104 is connected to the engine 102. The engine starter 104 can be an electric motor engaged by the machine's 100 ignition switch 106, but could also be any suitable kinetic energy source capable of starting an engine. The engine starter 104 is connected to an electronic power source 108 such as a battery or other electronic storage, that supplies the engine starter with electric power. The engine 102 can also have injectors 110 that inject fuel, air, or other materials into the engine cylinders 109 for combustion. The embodiment schematically represented in FIG. 1 shows an engine 102 with eight cylinders 109 and eight injectors 110, though any number of injectors or cylinders is contemplated, and each cylinder can have more than one injector depending on the specific engine design. Pistons inside the cylinders 109 are connected to a crankshaft 103. The crankshaft 103 rotates as a result of the combustion within the cylinders 109 and corresponding piston oscillation.

The clutch 112 connects the engine 102 to the transmission 114 between the crankshaft 103 and the clutch shaft 105, with the crankshaft connecting the engine to the clutch, and the clutch shaft connecting the transmission to the clutch. The clutch 112 can be engaged or disengaged either automatically by an electronic control module 124 or by the machine 100 operator. Engaging the clutch 112 locks the crankshaft 103 and the clutch shaft 105 so that both rotate substantially at the same rate, applying power from the engine 102 to other components. When the clutch 112 is engaged, the engine 102 can apply power to the transmission 114. When the clutch 112 is disengaged, no power from the engine 102 is applied to the transmission 114 because the clutch does not transfer crankshaft 103 rotation to the clutch shaft 105.

In some embodiments, the clutch 112 also connects the engine 102 to auxiliary mechanisms 116. Auxiliary mechanisms 116 can be compressors, pumps for coolant, oil and other fluids, compressors, or any other mechanisms the machine 100 uses that require power. In such embodiments, engaging and disengaging the clutch 112 enables and disables, respectively, the application of power from the engine 102 to the auxiliary mechanisms 116. While the embodiment illustrated in FIG. 1 shows three auxiliary mechanisms 116, it is contemplated that any number of auxiliary mechanisms can be included. In other embodiments, it is contemplated that additional auxiliary clutches 113 separate from the clutch 112 can connect the engine 102 to the auxiliary mechanisms 116. In such embodiments, the auxiliary mechanisms 116 can be connected or disconnected from the engine 102 independently of whether the transmission 114 is connected or disconnected from the engine. The embodiment in FIG. 1 shows auxiliary clutches 113 between the auxiliary mechanisms 116 and the clutch 112; however, the auxiliary clutches can also be located between the engine 102 and the clutch, or bypass the clutch altogether by connecting the engine directly to the auxiliary mechanisms with the auxiliary clutches.

The machine 100 may also include a hybrid motor 118 that, in some embodiments, is connected to the transmission 114, auxiliary mechanisms 116, the engine 102, or any other powertrain 101 components. The hybrid motor 118 can apply power to the powertrain 101 components separately from or in addition to the engine 102, depending on whether the clutch 112 is engaged or disengaged, as is described in greater detail below. In some embodiments, the hybrid motor 118 receives energy from a stored energy source 120. The stored energy source 120 stores energy from a direct source, such as an electrical grid, or energy generated by the vehicle. The hybrid motor 118 uses the stored energy to apply power to powertrain 101 components. Although not shown in the figures, it is contemplated that additional clutches can separate the hybrid motor 118 from the powertrain 101 components. In such embodiments, the additional clutches engage and disengage to allow the hybrid motor 118 to apply power to certain powertrain 101 components and not other powertrain components at a given time, or apply power to all or none of the power train components at a given time.

To start the engine 102 in some embodiments, triggering the ignition switch 106 completes a circuit that allows electricity to flow from an electric power source 108 to the engine starter 104. The electric power source 108 can be a battery, a hard electrical line, or any other suitable source of electricity. The engine starter 104 converts the electric power from the electric power source 108 into kinetic energy to begin cycling the engine 102. At a certain point after the ignition switch 106 is triggered, the injectors 110 begin injecting fuel and air into the engine's 102 cylinders 109 to begin and maintain the combustion process. Pistons in the cylinders 109 oscillate in response to the combustion process and rotate the crankshaft 103. The rotating crankshaft 103 applies power to the powertrain 101 components to overcome resistant inertial forces and parasitic load of those components and cause them to rotate. Parasitic load can result from pump drag, engine friction, or other non-inertial loads on the engine.

The speed of the engine 102 can be described as the number of revolutions the engine causes the crankshaft 103 to make per minute (RPM). The engine 102 is capable of outputting a wide range of engine speeds. At certain engine 102 speeds, the vibration frequency caused by the engine can match the powertrain's 101 mechanical resonant frequencies. At these resonant frequency engine 102 speeds, the powertrain 101 components can experience large amplitudes of torque, which can damage the components. Similarly, the vibration frequency caused by the transmission 114 as it rotates can cause resonance in the powertrain 101. The transmission 114 speeds that cause resonance are identified as resonant frequency transmission 114 speeds in this disclosure.

The rotational speed of the powertrain 101 components may be determined using rotary encoders or other suitable rotation sensors. The embodiment illustrated in FIG. 1 shows a rotary sensor 122 connected to the electronic control module 124. The electronic control module 124 may also be connected operatively to both the engine 102, the hybrid motor 118, and the clutch 112, and is configured to control the activity of those and other components. Some embodiments may implement additional sensors to sense various engine 102 performance parameters and hybrid motor 118 performance parameters to identify incidents of resonance. By way of example only, torque sensors may be provided to identify and measure torque levels provided by the engine or the hybrid motor and experienced by the powertrain 101 components, or speed sensors may be provided to identify incidents of resonance. Engine parameter sensors 125 and hybrid parameter sensors 123 communicate signals indicative of the sensed parameters to the electronic control module 124. This disclosure refers to the torque levels caused by the engine 102 applying power to the powertrain 101 as engine torque levels, and the torque levels caused by the hybrid motor 118 applying power to the powertrain as hybrid torque levels. Hybrid parameter sensors 123 can sense the hybrid torque levels, and engine parameter sensors 125 can sense the engine torque levels. The engine parameter sensors 125 are operatively associated with the electronic control module 124 and adapted to send signals indicative of the engine performance parameters to the electronic control module. The hybrid parameter sensors 123 are also operatively associated with the electronic control module 124 and adapted to send signals indicative of the hybrid performance parameters to the electronic control module. The performance parameters for the engine 102 and the hybrid motor 118 can be speed, torque, acceleration, fuel injection rates, fuel consumption rates, resonance, energy consumption rates, or any other parameter. Additionally, information from the performance parameters can be used to determine other performance parameters. For example, resonance or torque can be determined based on engine speed. Other sensors can be used, for example, on the clutch shaft 105, to send signals to the electronic control module 124 to monitor the transmission 114 speed. The operative connection between the sensors and the electronic control module 124 can be made in any suitable manner, for example, wirelessly or by a hardwired electronic connection.

Figure 2:
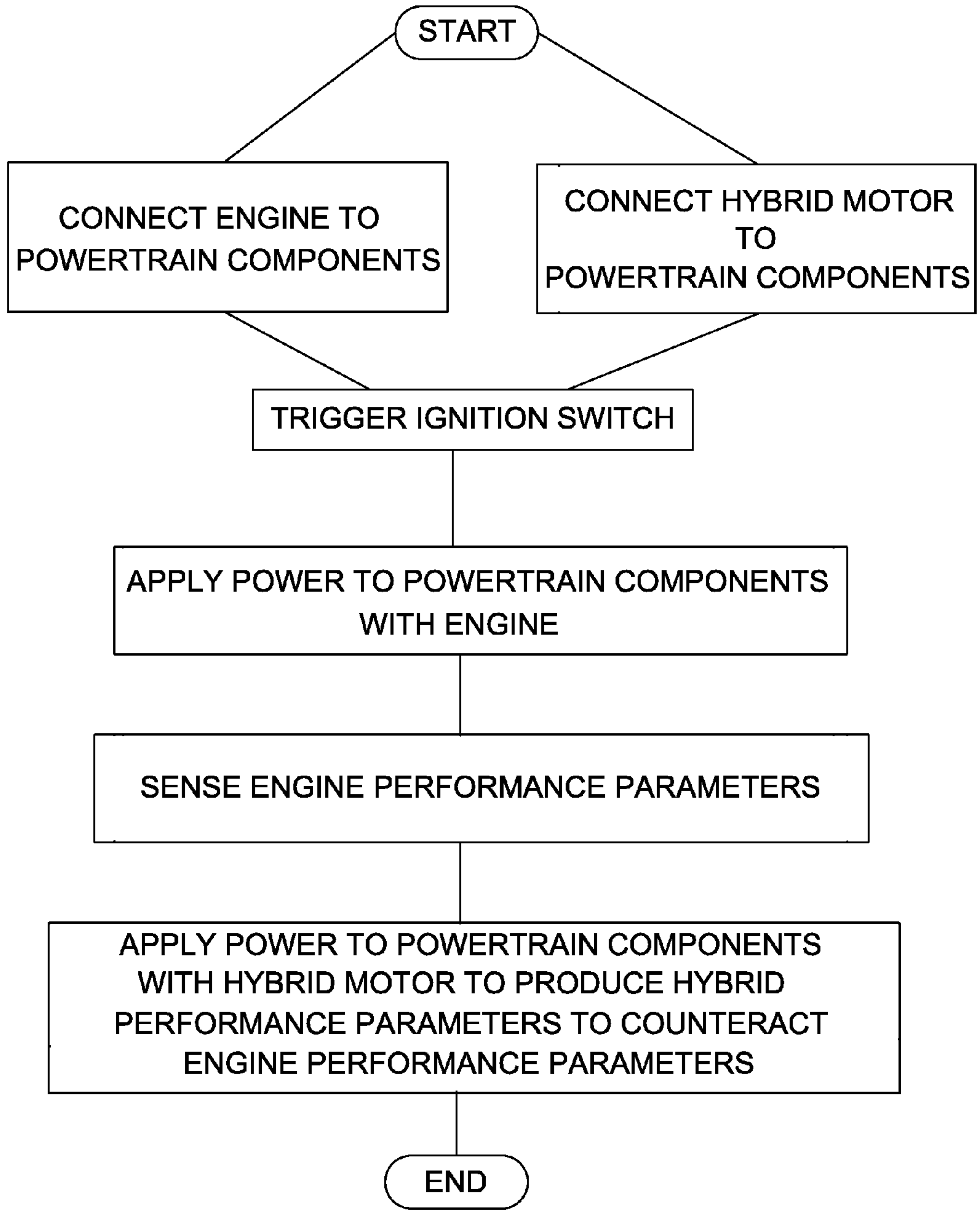
FIG. 2 is a flow chart illustrating another embodiment of an engine starting strategy in accordance with the disclosure.

Even though most machines are designed to avoid resonance during the normal operating range, the engine 102 speed upon startup can still cause resonance as the engine attempts to overcome inertial forces in the powertrain 101. As illustrated in FIG. 2, one method of avoiding resonant frequency involves monitoring engine 102 performance parameters using engine parameter sensors 125. The sensors can communicate the engine 102 performance parameters as well as the transmission 114 speed and torque levels experienced by the powertrain 101 components as a result of the power applied by the engine and the power being applied by the hybrid motor 118. The sensors send signals to the electronic control module 124 indicative of the engine performance parameters, the hybrid performance parameters, and/or transmission 114 speed. After the ignition switch 106 is triggered, the engine 102 applies power to the transmission 114, auxiliary mechanisms 116, or other powertrain components as the electronic control module 124 monitors the engine performance parameters, such as engine speed or torque levels. When the engine torque levels reach a predetermined amplitude, the electronic control module 124 instructs the hybrid motor 118 to apply an amount of power to the transmission 114 and/or auxiliary mechanisms 116 that will result in additive out-of-phase hybrid torque levels that are of equal but opposite amplitude to cancel out the resonance experienced by the powertrain 101 components. In one embodiment, the electronic control module 124 determines whether the powertrain 101 is experiencing resonance by sensing the engine 102 speed with the engine parameter sensors 125. Based on the engine 102 speed alone, the electronic control module can determine the engine 102 torque levels and resonance. The electronic control module 124 controls the hybrid motor to apply power to the transmission 114, auxiliary mechanisms 116, or other powertrain 101 components to provide a hybrid torque level that produces a frequency equal and opposite to that produced by engine. The torque provided by the hybrid motor 118 cancels out the torque provided by the engine 102 and overcomes the resonance felt by the powertrain 101 components. The proper hybrid torque levels can be determined using sensors, such as the hybrid parameter sensors 123. Alternatively, the proper nominal value for the power to apply with the hybrid motor 118 can be determined through testing to obviate the need for sensors.

The electronic control modules 124 of this disclosure may be of any conventional design having hardware and software configured to perform the calculations and send and receive appropriate signals to perform the engagement logic. The electronic control module 124 may include one or more controller units, and may be configured solely to perform the engagement strategy, or to perform the engagement strategy and other processes of the machine 100. The controller unit may be of any suitable construction, however in one example it comprises a digital processor system including a microprocessor circuit having data inputs and control outputs, operating in accordance with computer-readable instructions stored on a computer-readable medium. Typically, the processor will have associated therewith long-term (non-volatile) memory for storing the program instructions, as well as short-term (volatile) memory for storing operands and results during (or resulting from) processing.

The arrangement disclosed herein has universal applicability in various other types of machines. The term “machine” may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

INDUSTRIAL APPLICABILITY

The industrial application of the methods for starting a machine that avoid effects of resonant frequencies as described herein should be readily appreciated from the foregoing discussion. The present disclosure may be applicable to any type of machine utilizing a powertrain that experiences resonant frequencies. It may be particularly useful in machines that include a hybrid motor that can apply power to components of the machine’s powertrain.

The disclosure, therefore, may be applicable to many different machines and environments. One exemplary machine suited to the disclosure is an off-highway truck. Off-highway trucks have large components that burden the truck’s engine during startup with large inertial forces and parasitic load. These large inertial forces and parasitic load may result in damaging torque amplitudes experienced by the machine components at the powertrain’s resonant frequency. Thus, a method for starting a machine that avoids the effects of resonant frequencies is readily applicable to an off-highway truck.

Further, the methods above can be adapted to a large variety of machines. For example, other types of industrial machines, such as backhoe loaders, compactors, feller bunchers, forest machines, industrial loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine comprising:

at least one powertrain component;

an engine configured to apply power to the at least one powertrain component, the engine being operable at various engine speeds including a resonant frequency engine speed;

a hybrid motor configured to apply power to the at least one powertrain component;

an electronic control module configured to control the hybrid motor to apply power to the at least one powertrain component; and an engine parameter sensor operatively associated with the electronic control module, the engine parameter sensor configured to sense engine performance parameters and send signals indicative of the engine performance parameters to the electronic control module;

wherein the electronic control module is configured to monitor the engine performance parameters and control the hybrid motor to apply power to the at least one powertrain component to provide hybrid performance parameters to counteract the engine performance parameters.

2. The machine of claim 1, further comprising a hybrid parameter sensor operatively associated with the electronic control module, the hybrid parameter sensor configured to sense hybrid performance parameters and send signals indicative of the hybrid performance parameters to the electronic control module.

3. The machine of claim 1, wherein the engine parameter sensor is an engine speed sensor configured to sense the engine speed and send a signal indicative of the engine speed to the electronic control module.

4. The machine of claim 3 wherein:

the hybrid performance parameters are hybrid torque levels provided by the hybrid motor; and the electronic control module is further configured to:

monitor the engine speed;

determine engine torque levels based on the engine speed; and control the hybrid motor to apply power to the at least one powertrain component to provide hybrid torque levels that counteract the engine torque levels.

5. The machine of claim 1, wherein:

the engine parameter sensor is an engine torque sensor configured to sense engine torque levels produced by the engine and send signals indicative of the engine torque levels to the electronic control module; and the electronic control module is further configured to monitor the engine torque levels and control the hybrid motor to apply power to the at least one powertrain component to provide hybrid torque levels to counteract the engine torque levels.

6. A method of starting a machine, the method comprising steps of:

providing at least one powertrain component;

operatively connecting an engine to the at least one powertrain component, the engine being configured to apply power to the at least one powertrain component and to produce various engine performance parameters, and wherein the engine is operable at various engine speeds including a resonant frequency engine speed;

operatively connecting a hybrid motor to the at least one powertrain component, the hybrid motor being configured to apply power to the at least one powertrain component and to produce various hybrid performance parameters;

monitoring the engine performance parameters; and applying power to the at least one powertrain component with the hybrid motor to provide hybrid performance parameters to counteract the engine performance parameters.

7. The method of claim 6 wherein the engine performance parameters are the engine speed and the hybrid performance parameters are hybrid torque levels.

8. The method of claim 7, further comprising the steps of:

determining engine torque levels based on the engine speed; and applying power to the at least one powertrain component with the hybrid motor to provide hybrid torque levels that counteract the engine torque levels.

9. The method of claim 7, further comprising the step of operatively associating an electronic control module with the engine and the hybrid motor, the electronic control module configured to monitor engine speed and control the hybrid motor to apply power to the at least one powertrain component.

10. The method of claim 9, further comprising the steps of:

operatively associating an engine speed sensor with the engine, the engine speed sensor configured to sense the engine speed; and sending signals indicative of the engine speed to the electronic control module with the engine speed sensor.

11. The method of claim 9, further comprising the steps of commanding the hybrid motor with the electronic control module to apply power to the at least one powertrain component when the electronic control module determines that the engine speed has reached a predetermined engine speed.

12. The method of claim 6 wherein the engine performance parameters are engine torque levels and the hybrid performance parameters are hybrid torque levels.

13. The method of claim 12, further comprising the step of applying power to the at least one powertrain component with the hybrid motor to provide hybrid torque levels that counteract the engine torque levels.

14. The method of claim 12, further comprising steps of operatively associating an electronic control module with the engine and the hybrid motor, the electronic control module configured to monitor engine torque levels and control the hybrid motor to apply power to the at least one powertrain component.

15. The method of claim 14 further comprising the steps of:

operatively associating an engine torque sensor with the engine, the engine torque sensor configured to sense the engine torque levels; and sending signals indicative of the engine torque levels to the electronic control module with the engine torque sensor.

16. The method of claim 14, further comprising the step of commanding the hybrid motor with the electronic control module to apply power to the at least one powertrain component when the electronic control module determines that the engine torque levels have reached predetermined levels.

17. The method of claim 6, further comprising the steps of:

determining when the engine speed has exceeded the resonant frequency engine speed; and ceasing monitoring the engine performance parameters after the engine speed exceeds the resonant frequency engine speed.

18. A method of starting a machine, the method comprising steps of:

providing at least one powertrain component;

operatively connecting an engine to the at least one powertrain component, the engine being configured to apply power to the at least one powertrain component and to produce various engine torque levels, wherein the engine is operable at various engine speeds including a resonant frequency engine speed;

operatively connecting a hybrid motor to the at least one powertrain component, the hybrid motor being configured to apply power to the at least one powertrain component and to produce various hybrid torque levels;

determining the engine torque levels;

determining the hybrid torque levels;

operatively associating an electronic control module with the engine and the hybrid motor;

monitoring the engine torque levels and the hybrid torque levels with the electronic control module; and applying power to the at least one powertrain component with the hybrid motor to provide hybrid torque levels to counteract the engine torque levels.

* * * * *